United States Patent
Drapkin et al.

(10) Patent No.: US 7,106,125 B1
(45) Date of Patent: Sep. 12, 2006

(54) METHOD AND APPARATUS TO OPTIMIZE RECEIVING SIGNAL REFLECTION

(75) Inventors: Oleg Drapkin, Richmond Hill (CA); Grigory Temkine, Toronto (CA)

(73) Assignee: ATI International, SRL, (BB)

( * ) Notice: Subject to any disclaimer, the term of this patent is extended or adjusted under 35 U.S.C. 154(b) by 17 days.

(21) Appl. No.: 09/651,944

(22) Filed: Aug. 31, 2000

(51) Int. Cl.
*H03K 17/16* (2006.01)

(52) U.S. Cl. ............... 327/382; 327/379; 327/380; 327/381

(58) Field of Classification Search ............ 327/381, 327/379, 380, 382, 108, 110, 57, 538, 543, 327/390; 323/315
See application file for complete search history.

(56) References Cited

U.S. PATENT DOCUMENTS

| | | | | |
|---|---|---|---|---|
| 3,909,674 A | * | 9/1975 | Spence et al. | 317/16 |
| 4,041,332 A | * | 8/1977 | Ohhinata et al. | 327/381 |
| 4,590,389 A | * | 5/1986 | Cave et al. | 327/381 |
| 5,808,488 A | * | 9/1998 | Bruccoleri et al. | 327/57 |
| 5,844,836 A | * | 12/1998 | Kepler et al. | 365/156 |
| 5,973,967 A | * | 10/1999 | Nguyen et al. | 365/189.05 |
| 5,973,985 A | * | 10/1999 | Ferrant | 365/230.05 |
| 5,999,042 A | * | 12/1999 | Hemdal et al. | 327/554 |
| 6,044,010 A | * | 3/2000 | Deschene | 365/154 |
| 6,091,656 A | * | 7/2000 | Ooishi | 365/226 |
| 6,107,868 A | * | 8/2000 | Diniz et al. | 327/543 |
| 6,204,654 B1 | * | 3/2001 | Miranda et al. | 323/316 |

FOREIGN PATENT DOCUMENTS

JP    02000252430 A    *  9/2000

OTHER PUBLICATIONS

Millman and Halkias, Integrated Electronics Analog and Digital Circuits and Systems, McGraw-Hill, Inc, 1972, pp. 199-201.*

* cited by examiner

*Primary Examiner*—Tuan T. Lam
*Assistant Examiner*—Hiep Nguyen
(74) *Attorney, Agent, or Firm*—Volpe and Koenig, P.C.

(57) ABSTRACT

An input/output circuit in a receiving mode typically has disabled output buffers as well as other electrical components that provide significant receiver input capacities at high operating frequencies. A detection circuit detects the charging/discharging of the parasitic capacitance and operates a regulating circuit to compensate for the charging/discharging of the parasitic capacitance during rising/falling edges of an input signal, thereby correcting for impedance mismatch and reflection glitches.

7 Claims, 5 Drawing Sheets

Z input = $Z_B$ ∥ [$Z_C$ (or $Z_D$, or $Z_E$)]
if |$Z_C$| = |$Z_D$| = |$Z_E$|, then an Input signal can not change Z input

METHOD AND APPARATUS TO OPTIMIZE RECEIVING SIGNAL REFLECTION

BACKGROUND

The present invention relates to interconnected circuits operating at high frequency and, more particularly, to method and apparatus for compensating for impedance mismatch and reflection glitches which occur due to charging or discharging of an input receiver parasitic capacitor by the positive/negative going edges of the high frequency input signal.

The charging/discharging of the input receiver parasitic capacitor causes an additional impedance mismatch, and a reflection glitch. Stated in another way, in the presence of a rising edge signal of high frequency, this change will charge the parasitic capacitor. The energy used to charge the capacitor is derived from the signal inputted in the input/output device, causing the signal to be distorted. Distortion also occurs during the negative going edge of a high frequency signal similarly causing signal distortion due to discharge of the parasitic capacitor that likewise disturbs the signal.

To date, there is no technique for providing compensation for matching the line impedance because of charge/discharge of an input receiver parasitic capacitor.

SUMMARY

The present invention is characterized by comprising a method and apparatus for detecting variations in charge/discharge of an input parasitic capacitor and compensating for the detected condition by respectively discharging/charging said capacitor to eliminate or significantly reduce reflection glitches.

The charging/discharging detection circuit selectively controls circuitry for preventing the parasitic capacitor from drawing energy from the input signal during the occurrence of a rising edge and conversely prevents withdrawal and discharge from the parasitic capacitor in the presence of a negative-going input (falling edge), in order to assure impedance matching and to prevent a reflection glitch.

The detection and control circuitry may comprise an integrated circuit or any other electronic circuit to accomplish the desired result.

It is therefore, one object of the present invention, to provide an apparatus for compensating for impedance mismatch between interconnected circuits operating at high frequencies.

Another object of the present invention is to provide method and apparatus for preventing reflection glitches that occur due to the presence of parasitic capacitance at the input of a circuit receiving a high frequency signal.

Still another objection of the present invention is to provide method and apparatus for compensating for impedance mismatch between interconnected circuits by detecting the occurrence of charging/discharging of a parasitic capacitance at an input of the receiving circuit and utilizing the detected condition to respectively prevent energy from being withdrawn from/introduced into the input signal to the receiving circuit, thereby prevent reflection glitches.

BRIEF DESCRIPTION OF THE DRAWINGS

The above, as well as other objects of the present invention will become apparent when reading the accompanying description and drawings in which.

DESCRIPTION OF THE PREFERRED EMBODIMENTS

Transmitter output impedance and transmission line impedance matching and termination technique is a concern if the signals rising/falling timing is comparable with the flight time through the transmission line. In some electronic interfaces, it is very important that the impedance of a transmitter match the characteristic line impedance and that a receiver connected thereto be capable of operating like an open circuit. Still other interfaces employ additional line termination techniques in order to prevent reflection at the receiving end. In the later case, the additional terminated device or devices can be installed at the receiving end to minimize possible sources of reflection.

In some interfaces, it is recommended that both the transmitter and receiver be provided with terminations.

One of the main problems encountered in such devices is a receiver parasitic capacitor.

An input/output pad of a circuit receiver, when in the receiving mode, typically has disabled output buffers as well as some additional electronic devices that provide significant receiver input capacitance. In such case, additional current will be taken from (be sent to) the input signal to charge/discharge the parasitic capacitor, which causes impedance mismatch and reflected glitches resulting in distortion of the input signal. Although it is well-known to use serial or parallel termination devices (such as resistors, transistors, etc.) between the transmitter and the receiver to minimize the transmission line characteristic impedance mismatch, prior to the present invention there was no technique or apparatus known to these inventors that can provide additional receiver parasitic capacitor compensation to match the line impedance.

Figure 1A:
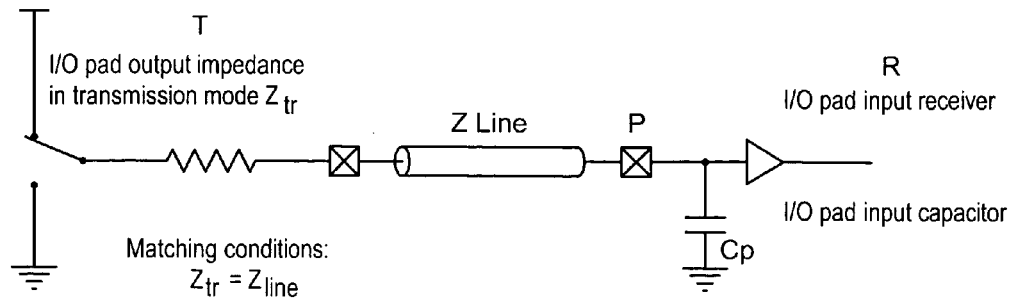
FIGS. 1A and 1B show simplified circuit diagrams useful in explaining the impedance mismatch problems occurring in interconnected circuits operating at high frequency.
Figure 1B:
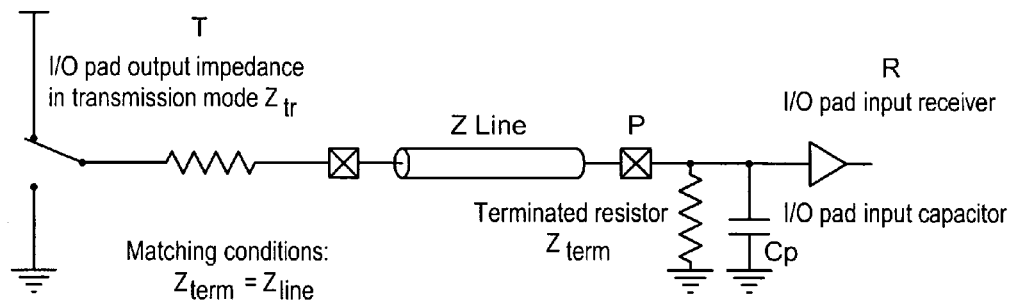

Reference will now be made to FIGS. 1A and 1B which aid in an understanding of the problems resolved by the method and apparatus of the present invention.

FIG. 1A shows a simplified serial circuit termination arrangement in which a transmitter T (represented by a switch to power or ground, and transmitter output impedance) is coupled through a transmission line to an input/output (I/O) pad P of a receiver R, the example being when the input/output device is operating as a receiver. Cp represents an input pad parasitic capacitor.

In the serial termination case shown in FIG. 1A, when the output impedance of the transmitter $Z_{TR}$ matches the transmission line impedance $Z_L$ the receiver R may be treated as an open circuit and there is optimum transfer of the transmitted signal to the receiver.

FIG. 1B shows the parallel termination case wherein the terminated resistor $Z_{TERM}$ is selected to have an impedance value which is equivalent to the impedance of the transmission line $Z_L$ in order to prevent signal reflection back to the transmitter. These terminations are conventional.

At high operating frequencies, it cannot be assumed that the input of the receiver R is an open circuit into the presence of an input parasitic capacitor in order to be able to treat the receiver R as an open circuit, thus the signal applied to the input of the receiver R will charge/discharge the parasitic capacitor. Such charging/discharging means that the signal that is received by the receiver R will be distorted. The same situation occurs with the parallel termination shown in FIG. 1B wherein the terminating resistor $Z_{TERM}$ is in parallel with the parasitic capacitance $C_P$. In addition, the higher the frequency, the greater the distortion. This distortion is particularly referred to as a "glitch" when the receiver has to have a strong signal and a spike is heard as a result of the distortion.

In the case where the incoming signal has a rising edge, the parasitic capacitor is charged at this time. The energy is taken from the input signal to charge the capacitor causes distortion of the input signal.

However, by providing a tracking or detecting circuit capable of providing additional current to charge the capacitor without taking energy out of the input signal to provide for such charge, it is possible to prevent or significantly reduce distortion of the input signal.

In the case where the signal is a negative going edge, capacitor $C_P$ at such time is already charged and will be discharged causing a disturbance of the signal. By use of the tracking device, the parasitic capacitor is prevented from discharging into the receiver thereby preventing a disturbance of the input signal and preventing "glitches".

Summarizing, in the presence of a parasitic capacitance at the input circuit of the receiver, the charge/discharge of the parasitic capacitance occurring during the presence of a negative or positive going edge causes distortion of the input signal.

Charging/discharging of the parasitic capacitance $C_P$ results in a current which is given by i=Cdv/dt. By tracking the current through the parasitic capacitance, it is possible to determine the rate of change of charge, i.e. positive or negative (charging or discharging). Determining the magnitude and direction of the current may be accomplished by a tracking system shown in FIG. 2A which magnitude and direction is utilized to provide compensation for the charging/discharging of the parasitic capacitor $C_P$ so that, for example, when the signal has a positive going edge, tracking system 10 provides the charging for the parasitic capacitor that would otherwise be derived from the input signal to prevent distortion of the input signal. Conversely, when the tracking system 10 detects a negative going edge, the tracking system prevents the parasitic capacitor from discharging into the input signal thereby preventing distortion during either positive going or negative going edges of the input signal.

Figure 2A:
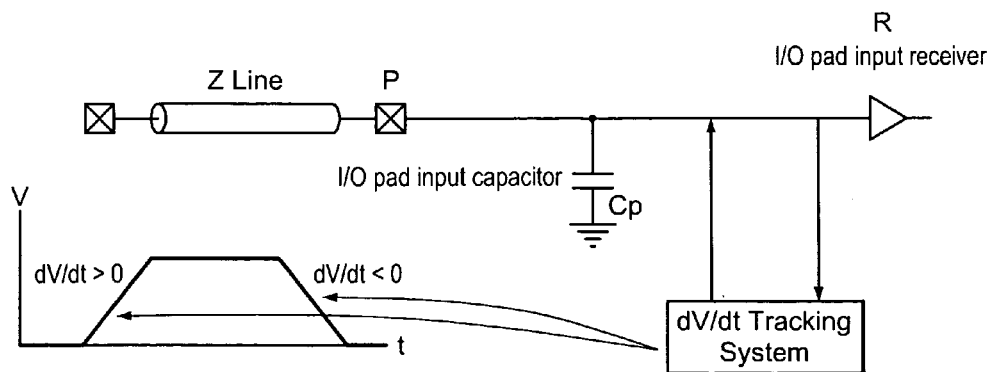
FIGS. 2A, 2B, 2C and 2D show simplified circuit diagrams of embodiments of the present invention that are useful in explaining the operation and capabilities of the present invention.
Figure 2B:
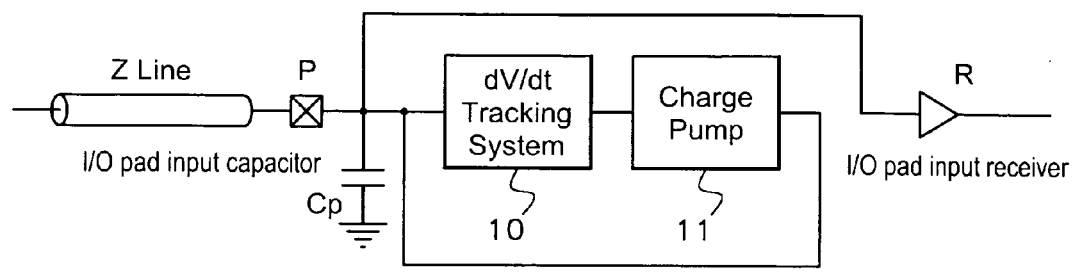

FIG. 2B shows a slightly more detailed schematic as compared with FIG. 2A, in which the tracking system 10 is a dv/dt analyzer operating a charge pump 11 to compensate for charging or discharging of parasitic capacitor $C_P$.

Figure 2C:
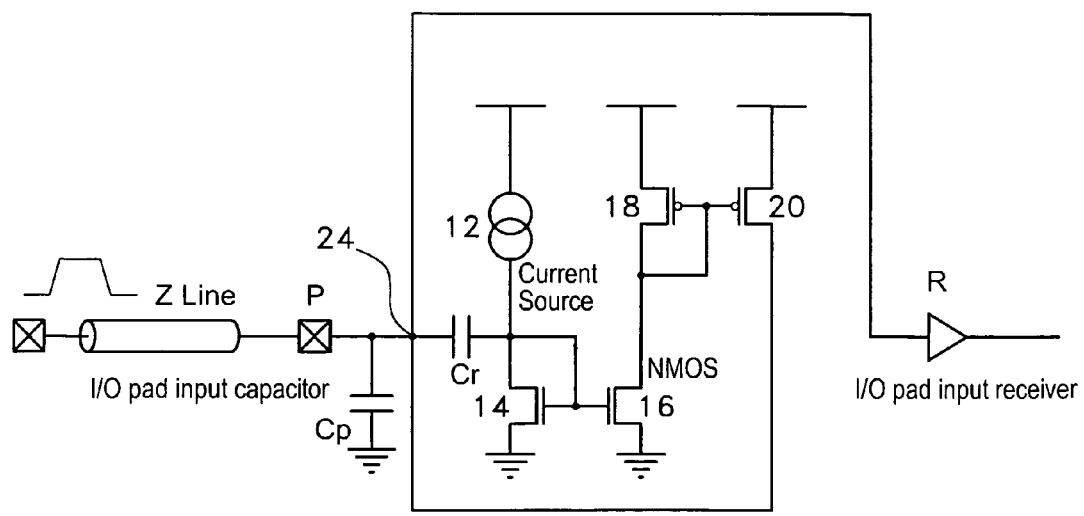

With reference to FIG. 2C, the input signal is shown applied to the I/O pad P through the transmission line represented by the impedance $Z_L$. The tracking system employs a capacitor $C_T$ having one terminal coupled to one terminal of the parasitic capacitance $C_P$ and the other terminal coupled between a current source 12 and an NMOS transistor 14 having its gate coupled its drain, as well as with the gate of the second NMOS transistor 16. A PMOS transistor 18 has its drain and gate coupled to a drain of NMOS transistor 16 as well as with the gate of the second PMOS transistor 20.

In operation, during a rising edge signal (+dv/dt), since the voltage of $C_T$ cannot change instantaneously, the voltage increases at terminal 22 which ultimately causes the drain of PMOS transistor 20 to provide sufficient current at terminal 24 to compensate for a portion of the current that would otherwise be provided to parasitic capacitance $C_P$ by the input signal.

During the negative edge of the signal (−dv/dt), the voltage instantaneously decreases at terminal 22 which ultimately causes the transistor 20 to prevent the voltage level of terminal 24 to be reduced, thereby preventing occurrence of a glitch during the negative going portion of the input signal.

Figure 2D:
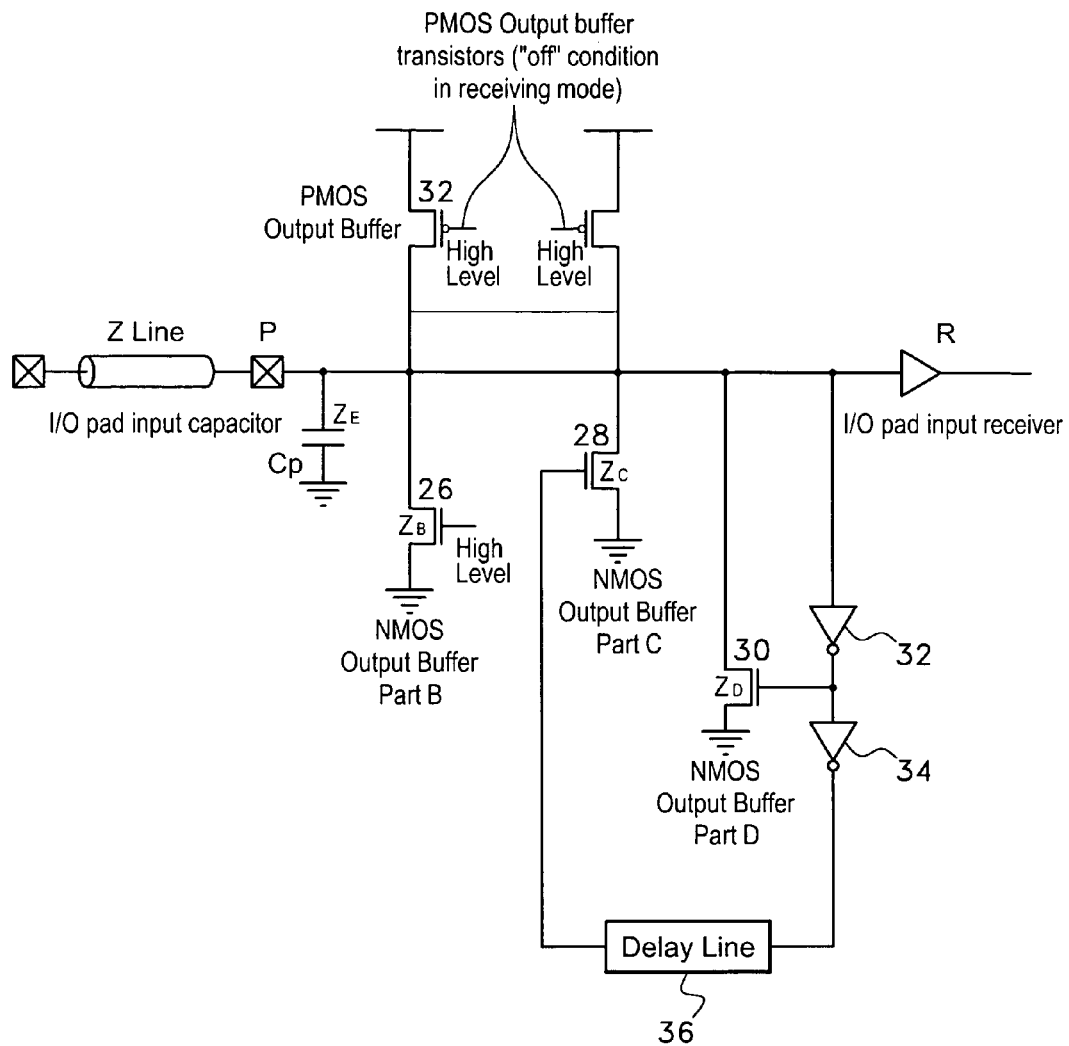

FIG. 2D shows still another embodiment of the present invention, NMOS output buffer transistor 26 being used as a parallel termination device. In this embodiment, under DC conditions, i.e. when an input signal is constant (high or low), the input impedance $Z_i$ is defined by the impedance of the circuit that includes NMOS transistor 26 having an impedance $Z_B$ in parallel with either the impedance $Z_C$ of the circuit that includes NMOS transistor 28 or the circuit including NMOS transistor 30 with the impedance $Z_D$. More specifically, when an input DC level is low, the value of input impedance is given by equation (1) ($Z_i=Z_B\|Z_D$). When an input DC level is high, the value of input impedance is given by equation (2) ($Z_i=Z_B\|Z_C$).

When the signal is changing and goes from a low level to a high level, the impedance is given by equation (3) ($Z_i=Z_B\|Z_E$), where $Z_E$ is an input pad parasitic capacitor impedance. When the level changes from high to low, the impedance is given by equation (4) ($Z_i=Z_B\|Z_E\|Z_C\|Z_D$).

In the AC case, the rising signal edge inverter 32 will turn "OFF" NMOS transistor 30, but inverter 34 within some time could not turn "ON" NMOS transistor 28 because of Delay Line 36. Delay Line 36 is chosen to delay NMOS transistor 28 to be "ON" until an input pad parasitic capacitor Cp will be charged and could not interfere with termination. As soon as $|Z_E|=|Z_C|=|Z_D|$ an input pad impedance should not be different during DC low level condition, low to high AC condition, and DC high level condition.

In the AC case, the falling signal edge inverter 32 will turn "ON" NMOS transistor 30, but inverter 34 within some time could not turn "OFF" NMOS transistor 28 because of Delay Line 36. Delay Line 36 is chosen to delay NMOS transistor 28 to be "OFF" until an input pad parasitic capacitor $C_P$ will be discharged through this NMOS transistor 28 and could not interfere with termination.

Figure 3:
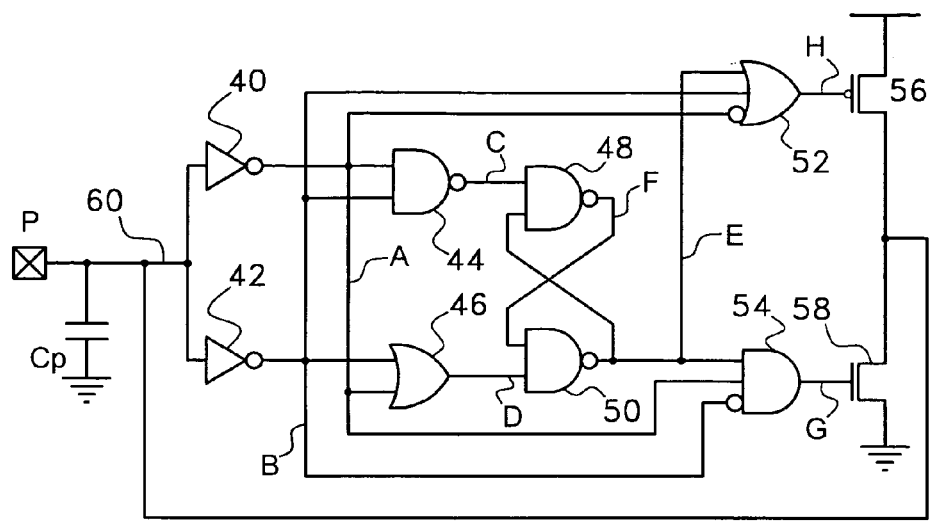
FIG. 3 shows an additional embodiment of the present invention.
Figure 3:
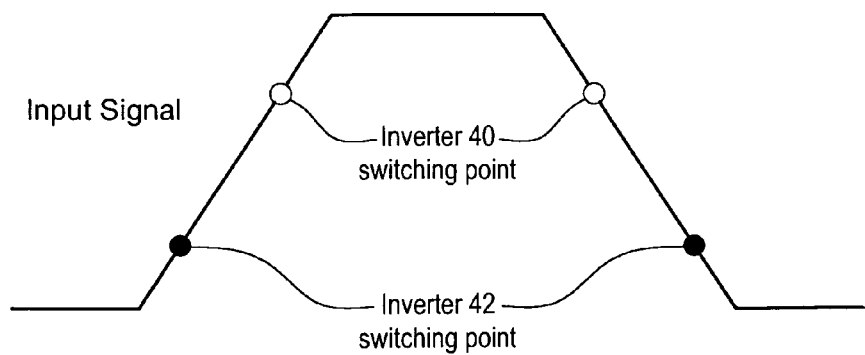

Another embodiment of the invention is shown in FIG. 3 that employs digital logic circuits 40 through 54, PMOS transistor 56 and NMOS transistor 58.

Figure 4:
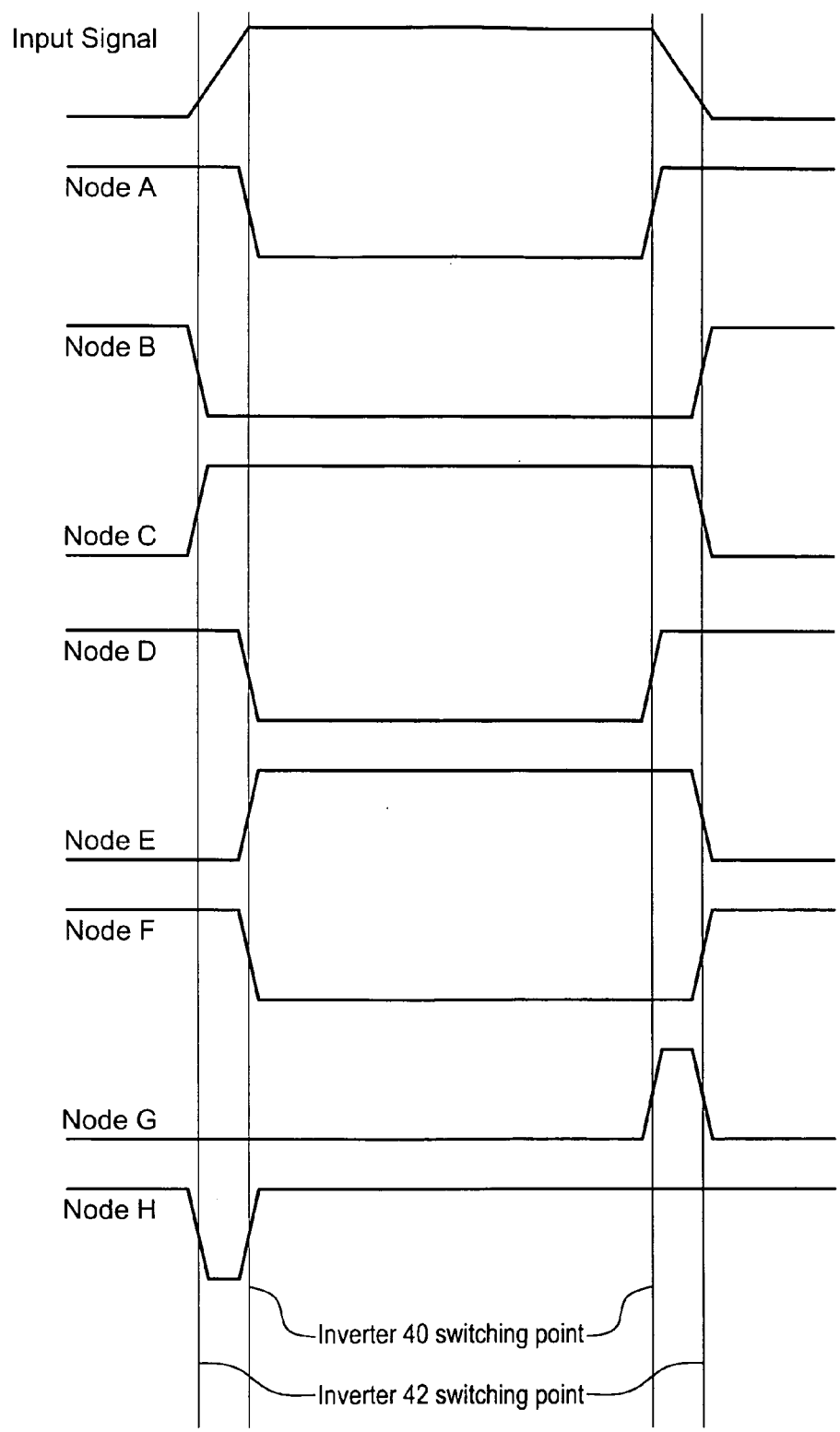
FIG. 4 shows a timing diagram useful to understand the FIG. 3 schematic.

During occurrence of a positive edge of the input signal, transistor 56 provides current to terminal 60 (voltage pulse at the node H, FIG. 4, that is the gate of transistor 56), and transistor 58 is not conducting, due to the logic circuitry (low voltage at node G, FIG. 4, that is the gate of transistor 58).

During the occurrence of a negative edge of the input signal, transistors 58 and 56 are respectively conducting (voltage pulse at node G, FIG. 4, that is the gate of transistor 58) and non-conducting (high voltage at node H FIG. 4, that is the gate of transistor 56) to prevent the parasitic capacitance from discharging current into the input signal source.

The embodiment of FIG. 3 employs two different thresholds (switching points) for the inverters 40 and 42. FIG. 3 shows an input signal with positive and negative edges and an intervening constant level. The inverter 42 switching point is lower compared with the inverter 40 switching point. That means at the rising signal edge the inverter 42 will be switched first, and the inverter 40 will be switched later. During the falling signal edge the inverter 40 will be switched first, and the inverter 42 will be switched later (FIG. 4, nodes A and B). The FIG. 3 schematic employs logic circuits (44, 46, 48, 50, 52, and 54) to detect a direction of change in voltage of input signal (low to high, or high to low), and based upon the detected direction, provides short pulses at the gates of NMOS transistor 58 (node G) and PMOS transistor 56 (node H) during the rising and falling edges of an input signal to compensate the parasitic input capacitor charge/discharge current.

What is claimed is:

1. A method for reducing distortion of a signal applied to an input of a high frequency circuit having a parasitic capacitance between said input and ground, comprising the steps of:
    employing a device responsive to a rate of change of voltage for detecting at said input a direction of change in voltage of said input signal;
    activating a charge pump for introducing a current to said parasitic capacitance to prevent said parasitic capacitance from drawing current from said input signal responsive to detection of a rate of change of a positive edge of said input signal by said device;
    said charge pump having a first transistor which is activated for preventing discharge of said parasitic capacitance into the input of the circuit by preventing a change of voltage at said input responsive to detection of a rate of change of a negative edge of said input signal;
    said charge pump further comprising:
        the first transistor connected to a first node, a second node, and a third node;
        a second transistor connected to the first node and the second node;
        a third transistor connected to the second node, a fourth node, and ground;
        a fourth transistor connected to the fourth node and ground;
        a current source connected to the first node and the fourth node; and
        a capacitor connected to the fifth node and the fourth node.

2. The method of claim 1, wherein:
    the first transistor is a PMOS transistor;
    the second transistor is a PMOS transistor;
    the third transistor is an NMOS transistor; and
    the fourth transistor is an NMOS transistor.

3. An apparatus for reducing distortion of a signal applied to an input of a circuit operating at a high frequency and having a parasitic capacitance between said input and ground, comprising:
    a voltage detection circuit coupled to said input for detecting a rate of change in voltage of said input signal;
    a correction circuit comprising a charge pump circuit coupled between said voltage detection circuit and said input to generate a current for compensating for current from said input signal diverted to said parasitic capacitance responsive to a rate of change of voltage of a positive edge of said input signal detected by said voltage detection circuit;
    said voltage detection circuit comprises a capacitor coupled between a common terminal and said input;
    said charge pump having a first transistor which is activated for preventing discharge of said parasitic capacitance into the input of said circuit operating at a high frequency by preventing a change of voltage at said input responsive to detection of a rate of change of a negative edge of said input signal;
    said charge pump further comprising:
        the first transistor is connected to a first node, a second node, and a third node;
        a second transistor is connected to the first node and the second node;
        a third transistor is connected to the second node, the common terminal, and ground;
        a fourth transistor is connected to the common terminal and ground; and
        a current source is connected to the first node and the common terminal.

4. The apparatus of claim 3 wherein said detection circuit being isolated from an output of the circuit operating at a high frequency.

5. The apparatus of claim 3, wherein:
    the first transistor is a PMOS transistor;
    the second transistor is a PMOS transistor;
    the third transistor is an NMOS transistor; and
    the fourth transistor is an NMOS transistor.

6. An apparatus for reducing distortion of a signal applied to an input of a circuit operating at a high frequency and having a parasitic capacitance between said input and ground, comprising:
    a voltage detection circuit coupled to said input for detecting a rate of change in voltage of said input signal;
    a correction circuit coupled between said voltage detection circuit and said input wherein the correction circuit compensates for variations of said input signal caused by said parasitic capacitance;
    said voltage detection circuit comprises a capacitor coupled between a common terminal and said input; and
    wherein the correction circuit comprises:
    a first transistor coupled to a first node, a second node, and a third node;
    a second transistor coupled to the first node and the second node;
    a third transistor coupled to the second node, the common terminal, and ground;
    a fourth transistor coupled to the common terminal and ground; and
    a current source coupled to the first node and the common terminal.

7. The apparatus of claim 6, wherein:
    the first transistor is a PMOS transistor;
    the second transistor is a PMOS transistor;
    the third transistor is an NMOS transistor; and
    the fourth transistor is an NMOS transistor.

* * * * *

UNITED STATES PATENT AND TRADEMARK OFFICE
CERTIFICATE OF CORRECTION

| | | |
|---|---|---|
| PATENT NO. | : 7,106,125 B1 | Page 1 of 1 |
| APPLICATION NO. | : 09/651944 | |
| DATED | : September 12, 2006 | |
| INVENTOR(S) | : Drapkin et al. | |

It is certified that error appears in the above-identified patent and that said Letters Patent is hereby corrected as shown below:

IN THE SPECIFICATION

At column 2, line 18, after the words "if the", delete "signals" and insert therefor --signal's--.

At column 3, line 17, after the word "capacitor", insert --and--.

At column 3, line 63, after the word "coupled", insert --to--.

At column 4, line 5, after the words "of the", insert --input--.

IN THE CLAIMS

At claim 1, column 5, line 43, after the words "to the", delete "fifth" and insert therefor --third--.

Signed and Sealed this

Twenty-second Day of July, 2008

JON W. DUDAS
*Director of the United States Patent and Trademark Office*